US012039933B2

(12) United States Patent
Kim et al.

(10) Patent No.: US 12,039,933 B2
(45) Date of Patent: Jul. 16, 2024

(54) OLEDOS PIXEL COMPENSATION CIRCUIT FOR REMOVING SUBSTRATE EFFECT, AND METHOD FOR CONTROLLING SAME

(71) Applicants: SUNIC SYSTEM. LTD., Suwon-si (KR); ARTETECHNOLOGY, Seongnam-si (KR)

(72) Inventors: Hye Dong Kim, Suwon-si (KR); Jong Jin Kim, Suwon-si (KR); Seong Ik Jeong, Seongnam-si (KR)

(73) Assignees: SUNIC SYSTEM, LTD., Suwon-si (KR); ARTETECHNOLOGY, Seongnam-si (KR)

( * ) Notice: Subject to any disclaimer, the term of this patent is extended or adjusted under 35 U.S.C. 154(b) by 0 days.

(21) Appl. No.: 18/263,047

(22) PCT Filed: Jan. 11, 2022

(86) PCT No.: PCT/KR2022/000419
§ 371 (c)(1),
(2) Date: Jul. 26, 2023

(87) PCT Pub. No.: WO2022/164078
PCT Pub. Date: Aug. 4, 2022

(65) Prior Publication Data

US 2024/0087519 A1 Mar. 14, 2024

(30) Foreign Application Priority Data

Jan. 26, 2021 (KR) ........................ 10-2021-0010917

(51) Int. Cl.
*G09G 3/3233* (2016.01)
*G09G 3/3266* (2016.01)
*G09G 3/3291* (2016.01)

(52) U.S. Cl.
CPC ......... *G09G 3/3233* (2013.01); *G09G 3/3266* (2013.01); *G09G 3/3291* (2013.01); *G09G 2310/08* (2013.01); *G09G 2320/0233* (2013.01)

(58) Field of Classification Search
CPC .. G09G 3/3233; G09G 3/3266; G09G 3/3291; G09G 2310/08; G09G 2320/0233
See application file for complete search history.

(56) References Cited

U.S. PATENT DOCUMENTS

| | | | | |
|---|---|---|---|---|
| 10,004,124 B1 * | 6/2018 | Ko | | G09G 3/3233 |
| 2011/0115764 A1 | 5/2011 | Chung | | |
| 2015/0348464 A1 * | 12/2015 | In | | G09G 3/2022 345/82 |

FOREIGN PATENT DOCUMENTS

| | | |
|---|---|---|
| JP | 2009-115840 A | 5/2009 |
| JP | 2009-116115 A | 5/2009 |

(Continued)

OTHER PUBLICATIONS

International Search Report issued in corresponding PCT Application No. PCT/KR2022/000419, mailed Apr. 27, 2022. (English Translation Provided).

(Continued)

*Primary Examiner* — Lixi C Simpson
(74) *Attorney, Agent, or Firm* — NORTON ROSE FULBRIGHT US LLP

(57) ABSTRACT

The present invention relates to an OLED pixel compensation circuit for removing a substrate effect. The pixel compensation circuit according to the present invention uses six transistors and two storage batteries to fix both a source voltage and a body voltage of a driving transistor that drives (Continued)

(a) (b)

an OLED, thereby having the effects of eliminating errors due to a substrate effect and presenting more accurate pixel compensation results.

5 Claims, 10 Drawing Sheets

(56) References Cited

FOREIGN PATENT DOCUMENTS

| | | | |
|---|---|---|---|
| JP | 2013-131608 | A | 7/2013 |
| JP | 2020-076974 | A | 5/2020 |
| JP | 2020-101604 | A | 7/2020 |
| KR | 10-2011-0080040 | | 7/2011 |
| KR | 10-2011-0104708 | | 9/2011 |
| KR | 10-2013-0087128 | | 8/2013 |
| KR | 10-1341797 | | 12/2013 |

OTHER PUBLICATIONS

Office Action issued in related Japanese Application No. 2023-569593, dated Mar. 19, 2024 (Japanese only).

* cited by examiner

OLEDOS PIXEL COMPENSATION CIRCUIT FOR REMOVING SUBSTRATE EFFECT, AND METHOD FOR CONTROLLING SAME

CROSS-REFERENCE TO RELATED APPLICATIONS

This application is a national phase application under 35 U.S.C. § 371 of International Application No. PCT/KR2022/000419, filed Jan. 11, 2022, which claims priority to and the benefit of Korean Application No. 10-2021-0010917, filed Jan. 26, 2021. The contents of the referenced patent applications are incorporated into the present application by reference.

FIELD OF THE DISCLOSURE

The present invention relates to a pixel circuit for driving an organic light-emitting diode (OLED).

DESCRIPTION OF RELATED ART

A typical pixel compensation circuit for driving an organic light-emitting diode (OLED) consists of four transistors and two capacitors. FIG. 1 shows an example of the typical pixel compensation circuit. All transistors used in the typical pixel compensation circuit are P-type transistors.

The driving of the OLED is performed through three operations including detecting a threshold voltage, transmitting voltage information, and emitting light.

In the detecting of threshold voltage, T4 is turned off to turn off the OLED, T1 and T3 are turned on, and thus a voltage difference between a source and a gate is set as a threshold to be stored in capacitors C1 and C2.

In the transmitting of the voltage information, T3 is turned off, only T1 is turned on, and thus a data voltage DATA is transmitted to C1 through T1. The transmitted voltage information is divided and stored in C1 and C2.

In the emitting of the light, T1 is turned off, only T4 is turned on, a current flows from an ELVDD to the OLED, and thus the OLED emits light.

However, a voltage between a source and a body of T2 in the detecting of the threshold voltage and a voltage between the source and the body of T2 in the emitting of the light are different. This is because a source voltage of T2 is varied. Therefore, due to a substrate effect, the threshold voltage of T2 for each operation is different, and an error occurs in the driving current of the OLED, causing a problem of outputting an image.

SUMMARY

The inventors of the present invention have made research efforts to solve the above problem of the OLED driving circuit according to the related art. The present invention has been completed after much effort to provide an OLED driving circuit and its control method that can reduce an error of an OLED driving current and more accurately compensate by eliminating the substrate effect by fixing the source voltage of the driving transistor.

The present invention is directed to providing an organic light-emitting diode (OLED) pixel compensation circuit in which an error of an OLED driving current is reduced by removing a substrate effect, and a control method thereof.

Meanwhile, other unspecified objects of the present invention will be additionally considered within the scope that can be easily inferred from the following detailed description and an effect thereof.

One aspect of the present invention provides an organic light-emitting diode (OLED) pixel compensation circuit includes an OLED element; a driving transistor configured to drive the OLED element in response to a data signal voltage applied to a gate electrode connected to a second node and connect between a power voltage and a third node, a first transistor switched by a current scan signal $SCAN_{[n]}$ and configured to transmit the data signal voltage, which is input, to a second capacitor connected to a first node, a second transistor switched by a compensation signal and configured to transmit a reference voltage to the second capacitor connected to the first node, a third transistor switched by a scan signal $SCAN_{[n-2]}$, which is two timings earlier than the current scan signal, and configured to transmit the reference voltage to the second node between a first capacitor and the second capacitor, a fourth transistor switched by a scan signal $SCAN_{[n-1]}$, which is one timing earlier than the current scan signal, and configured to connect between the second node and the third node, a fifth transistor switched by an emission signal and configured to connect between the third node and one end of the OLED element whose other end is connected to a ground, the first capacitor connected between the power voltage and the second node, and the second capacitor connected between the first node and the second node.

The first to fifth transistors and the driving transistor may be P-type transistors.

The OLED element may be an OLED on silicon (OLEDoS).

Bodies of the first to fifth transistors and the driving transistor may be connected to the power voltage.

Another aspect of the present invention provides a control method of an organic light-emitting diode (OLED) pixel compensation circuit, which includes (a) an initialization operation of turning the second transistor and third transistor on and turning the remaining transistors off, (b) a threshold voltage detection operation of maintaining the second transistor in the turned-on state, turning the fourth transistor on, and turning the remaining transistors off, (c) an information input operation of turning only the first transistor on and turning the remaining transistors off, and (d) a light emission operation of turning only the fifth transistor on and turning the first to fourth transistors off, wherein the driving transistor is switched by a voltage of the second node to drive the OLED element.

In accordance with the present invention, by fixing both a source voltage and a body voltage of the driving transistor, there is an effect that an error due to a substrate effect does not occur and a more accurate pixel compensation result can be presented.

Meanwhile, even for effects that are not explicitly described herein, it is noted that the effects described in the above specification and expected from the technical features of the present invention and their provisional effects are considered as being described in the specification of the present invention.

It is noted that the accompanying drawings are illustrated as references for understanding the technical spirit of the present invention, and therefore the scope of the present invention is not limited thereto.

DETAILED DESCRIPTION OF THE INVENTION

Hereinafter, with reference to the accompany drawings, a configuration of the present invention guided by various embodiments of the present invention and effects resulting from the configuration will be described. In the following description of the present invention, when a detailed description of a known related art is obvious to those skilled in the art and is determined to obscure the gist of the present invention, the detailed description thereof will be omitted.

The terms "first," "second," and the like can be used to describe various components, but the components should not be limited by these terms. These terms may be used only for the purpose of distinguishing one component from another component. For example, without departing from the scope of the present invention, a first component may be referred to as a second component, and similarly, a second component may also be referred to as a first component. In addition, the singular form includes the plural form unless the context clearly indicates otherwise. Unless otherwise defined, the terms used in the embodiments of the present invention may be construed as commonly known to those skilled in the art.

Hereinafter, with reference to the accompany drawings, a configuration of the present invention guided by various embodiments of the present invention and effects resulting from the configuration will be described.

Figure 1:
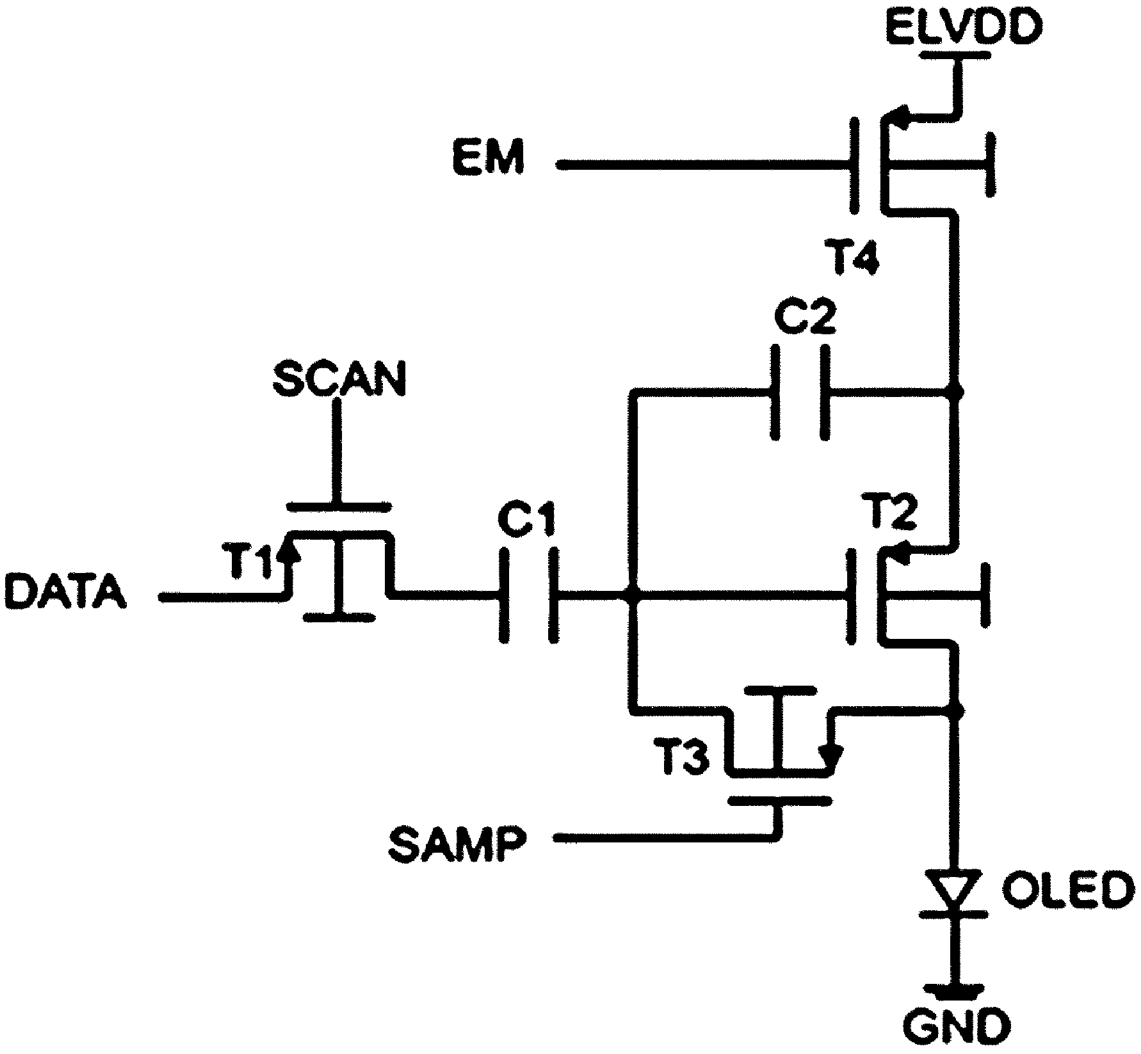
Prior Art FIG. 1
FIG. 1 is a diagram illustrating an example of a conventional pixel compensation circuit.
Figure 2:
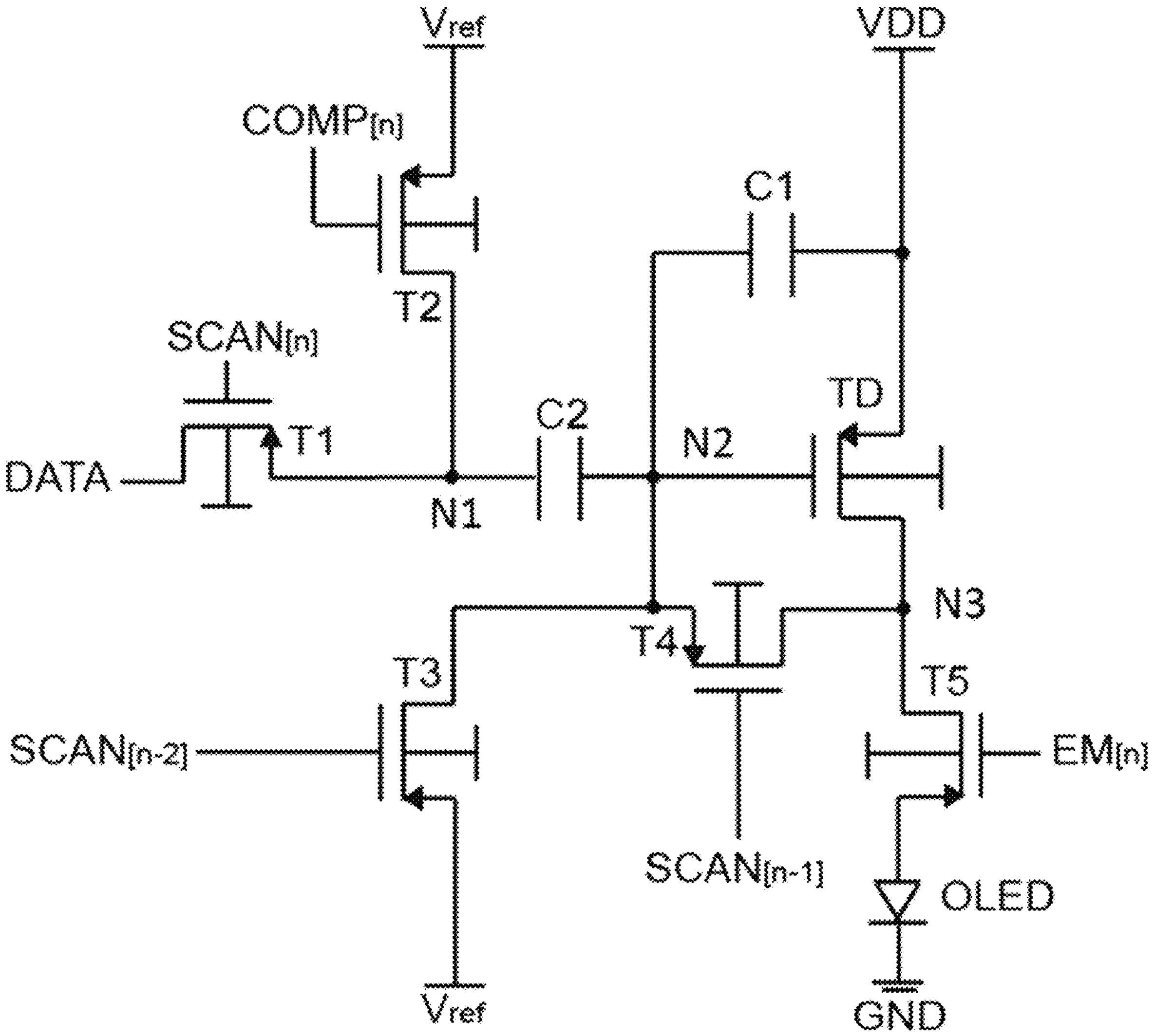
FIG. 2 is a circuit diagram illustrating a pixel compensation circuit according to an exemplary embodiment of the present invention.

FIG. 2 is a circuit diagram illustrating a pixel compensation circuit according to an exemplary embodiment of the present invention.

A pixel compensation circuit according to the present invention consists of six transistors and two capacitors in order to remove a substrate effect. All the transistors used in the present invention may be P-type transistors. In addition, an organic light-emitting diode (OLED), which is a light-emitting element, may be an OLED on silicon (OLEDoS).

A driving transistor TD for driving the OLED, which is a light-emitting element, transmits a power voltage VDD to the OLED, and the driving transistor TD is switched by a data voltage DATA with a second node N2 being connected to a gate electrode thereof. To this end, the driving transistor TD connects between the power voltage VDD and a third node N3. The driving transistor TD adjusts a current flowing in the OLED using a voltage difference between a gate and a source.

A first transistor T1 is switched by a current scan signal $SCAN_{[n]}$ and transmits the data voltage DATA to a second capacitor C2 connected to a first node N1.

A second transistor T2 is switched by a compensation signal $COMP_{[n]}$ and transmits a reference voltage $V_{ref}$ to the second capacitor C2 connected to the first node N1.

A third transistor T3 is switched by a scan signal $SCAN_{[n-2]}$, which is two timings earlier than the current scan signal $SCAN_{[n]}$, and transmits the reference voltage $V_{ref}$ to the second node N2 between the first capacitor C2 and the second capacitor C1.

A fourth transistor T4 is switched by a scan signal $SCAN_{[n-1]}$, which is one timing earlier than the current scan signal $SCAN_{[n]}$, and connects between the second node N2 and a third node N3.

A fifth transistor T5 is switched by an emission signal $EM_{[n]}$ and connects between the third node N3 and one end of the OLED whose other end is connected to a ground GND.

The first capacitor C1 connects between the power voltage VDD and the second node N2.

The second capacitor C2 connects between the first node N1 and the second node N2.

Bodies of all the transistors included in the pixel compensation circuit of the present invention may be connected to the power voltage VDD.

The pixel compensation circuit according to the present invention may be driven through four operations including initialization, threshold voltage detection, information input, and light emission.

FIGS. 3 to 6 are diagrams illustrating an operation of the pixel compensation circuit for each timing according to an exemplary embodiment of the present invention.

The four operations are performed in one frame time. The initialization operation, the threshold voltage detection operation, and the information input operation are each performed during one line time, and the light emission operation is performed in the remaining time by subtracting three line times from the one frame time.

Figure 3:
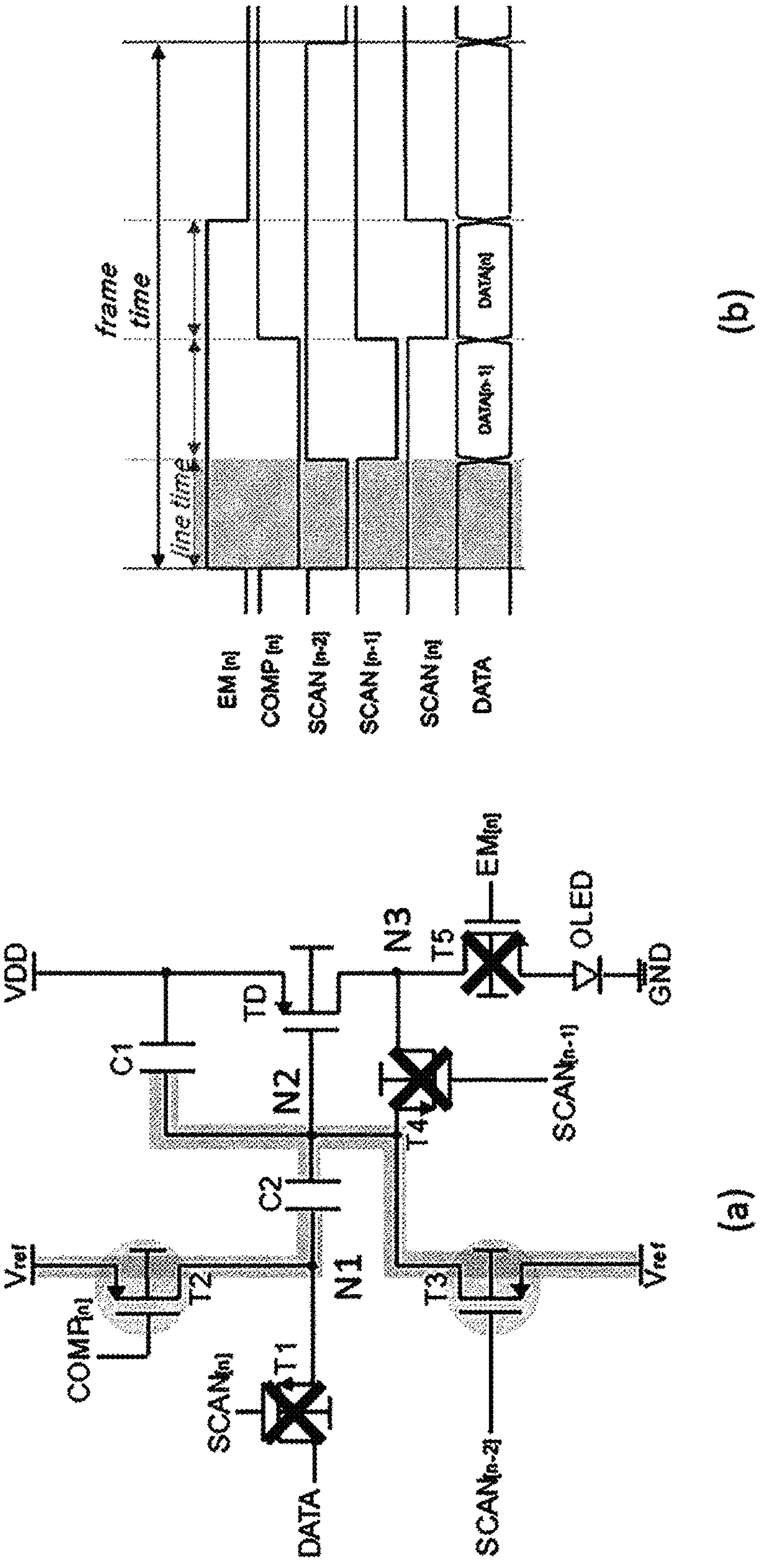
FIGS. 3 to 6 are diagrams illustrating an operation of the pixel compensation circuit for each timing according to an exemplary embodiment of the present invention.

FIG. 3 shows an on-off state of each transistor and timings of control signals in the initialization operation.

In FIG. 3B, since only the compensation signal $COMP_{[n]}$ and the scan signal $SCAN_{[n-2]}$ from two timings earlier are zero, only the second transistor T2 and the third transistor T3 are turned on.

Therefore, the reference voltage $V_{ref}$ is transmitted to and stored in the second capacitor C2 through the second transistor T2 and is transmitted to and stored in the first capacitor C1 through the third transistor T3. Since the power voltage VDD and the reference voltage $V_{ref}$ are applied to both ends of the first capacitor C1, and the reference voltage $V_{ref}$ is applied to both ends of second capacitor C2, content stored in the two capacitors is erased, and the two capacitors are initialized.

Figure 4:
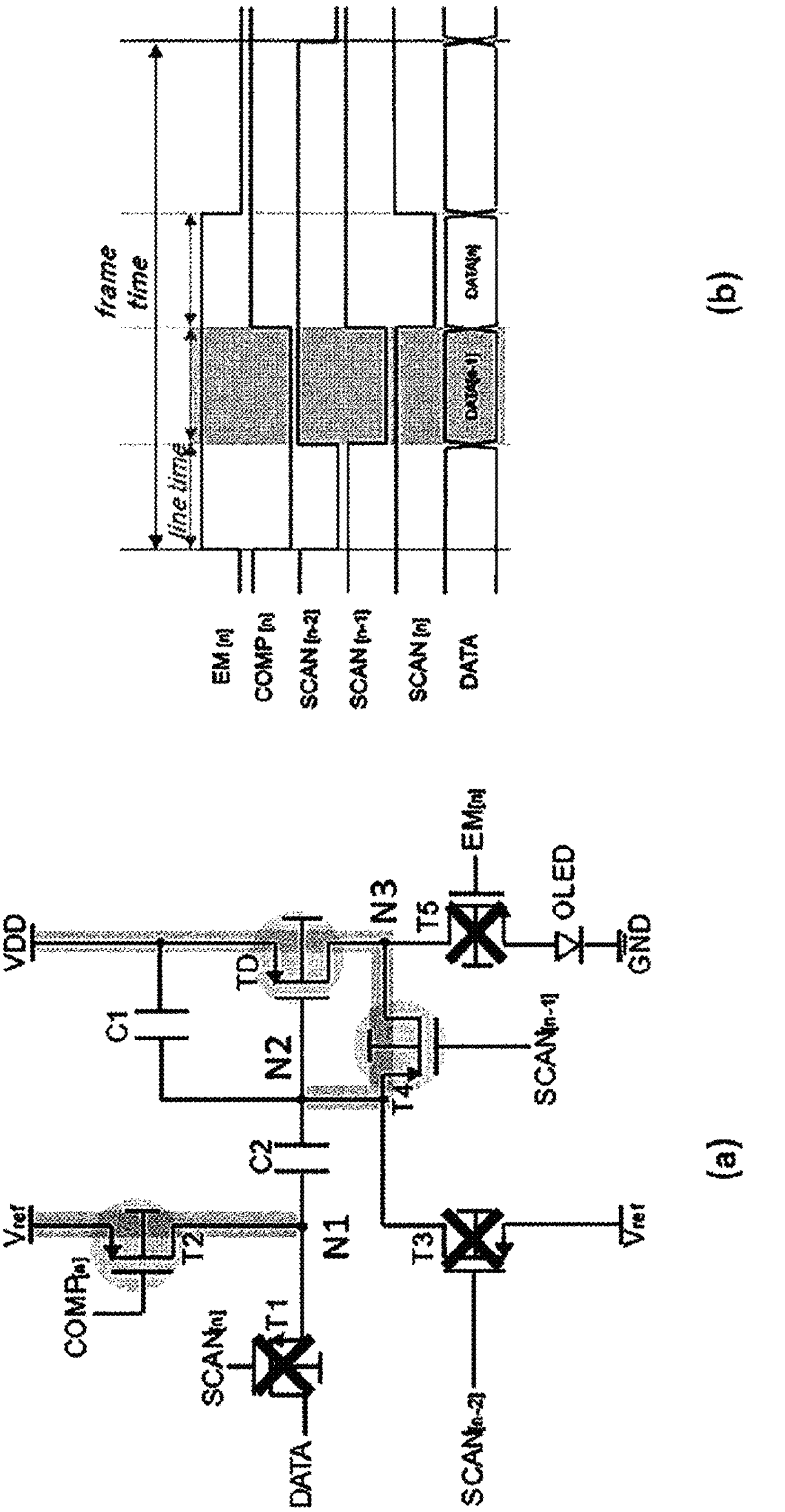

FIG. 4 shows an on-off state of each transistor and timings of the control signals in the threshold voltage detection operation.

In FIG. 4B, since the compensation signal $COMP_{[n]}$ is still zero and the scan signal $SCAN_{[n-1]}$ from one timing earlier is zero, the second transistor T2 and the fourth transistor T4 are turned on.

According to the gate and the source of the driving transistor TD connected to the fourth transistor T4, a gate voltage of the driving transistor TD reaches a voltage $VDD\text{-}V_{th,TD}$ by the fourth transistor T4.

In this case, a first charge amount $Q_1$ charged in the first capacitor C1 and the second capacitor C2 may be obtained by the following equation.

$$Q_1=C_1(V_{th,TD})+C_2(VDD+V_{th,TD}-V_{ref})$$

Figure 5:
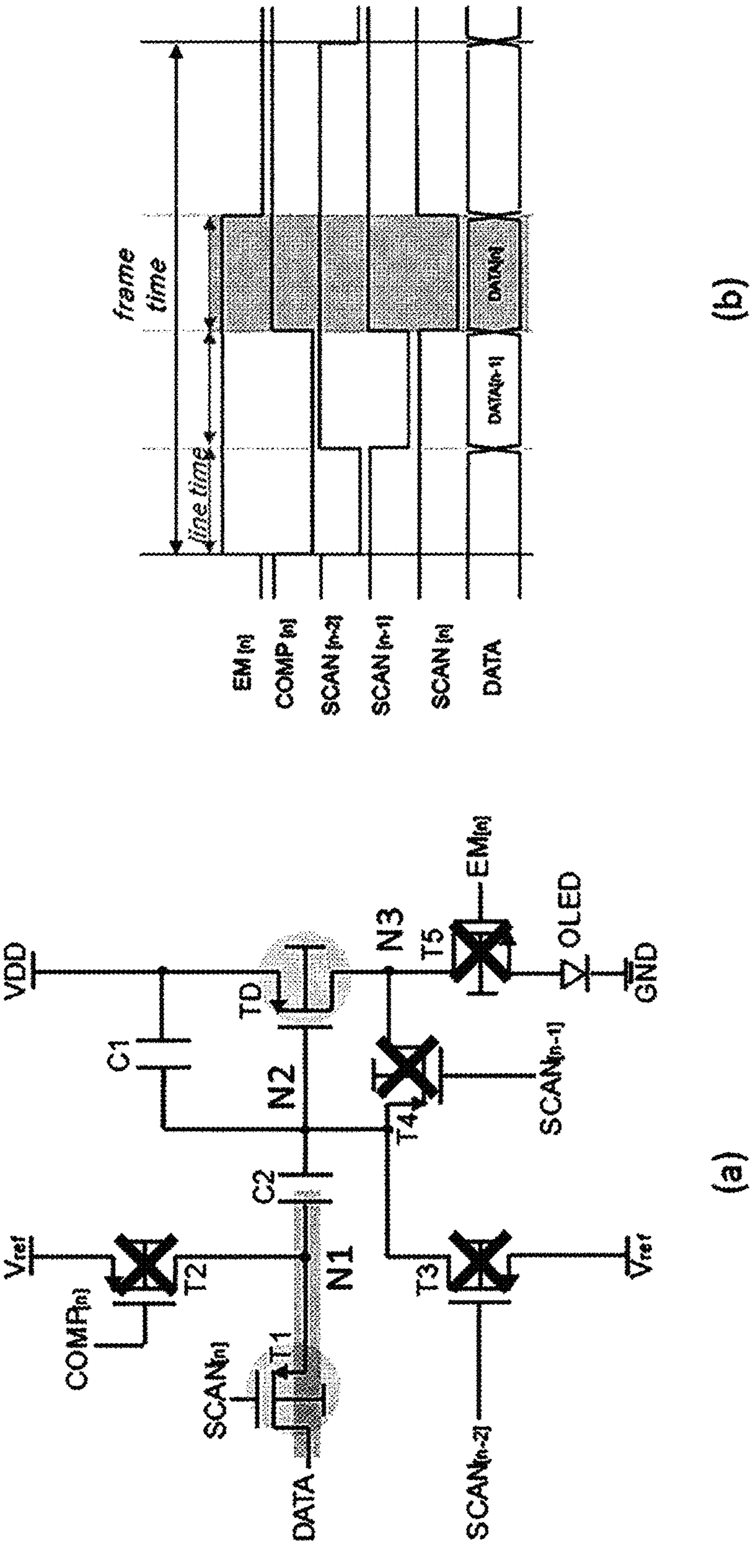

FIG. 5 shows an on-off state of each transistor and timings of the control signals in the information input operation.

Since only the current scan signal $SCAN_{[n]}$ is zero, only the first transistor T1 is turned on. Therefore, a data voltage $V_{DATA}$ containing information to be expressed by the OLED is transmitted to the second capacitor C2.

The data voltage $V_{DATA}$ transmitted to the second capacitor C2 varies the gate voltage of the driving transistor TD. When the varied gate voltage of the driving transistor TD is $V_x$, a second charge amount $Q_2$, which is a varied charge amount charged in the first capacitor C1 and the second capacitor C2, may be obtained by the following equation.

$$Q_1=C_1(V_x-VDD)+C_2(V_x-V_{DATA}),$$

According to the conservation law of electrical charge, the first charge amount $Q_1$ and the second charge amount $Q_2$ are equal ($Q_1=Q_2$). Therefore, the gate voltage $V_x$ of the driving transistor TD may be obtained as follows.

$$V_x=(C_1(V_{DATA}-V_{ref})/(C_1+C_2))+VDD+V_{th,TD}$$

Figure 6:
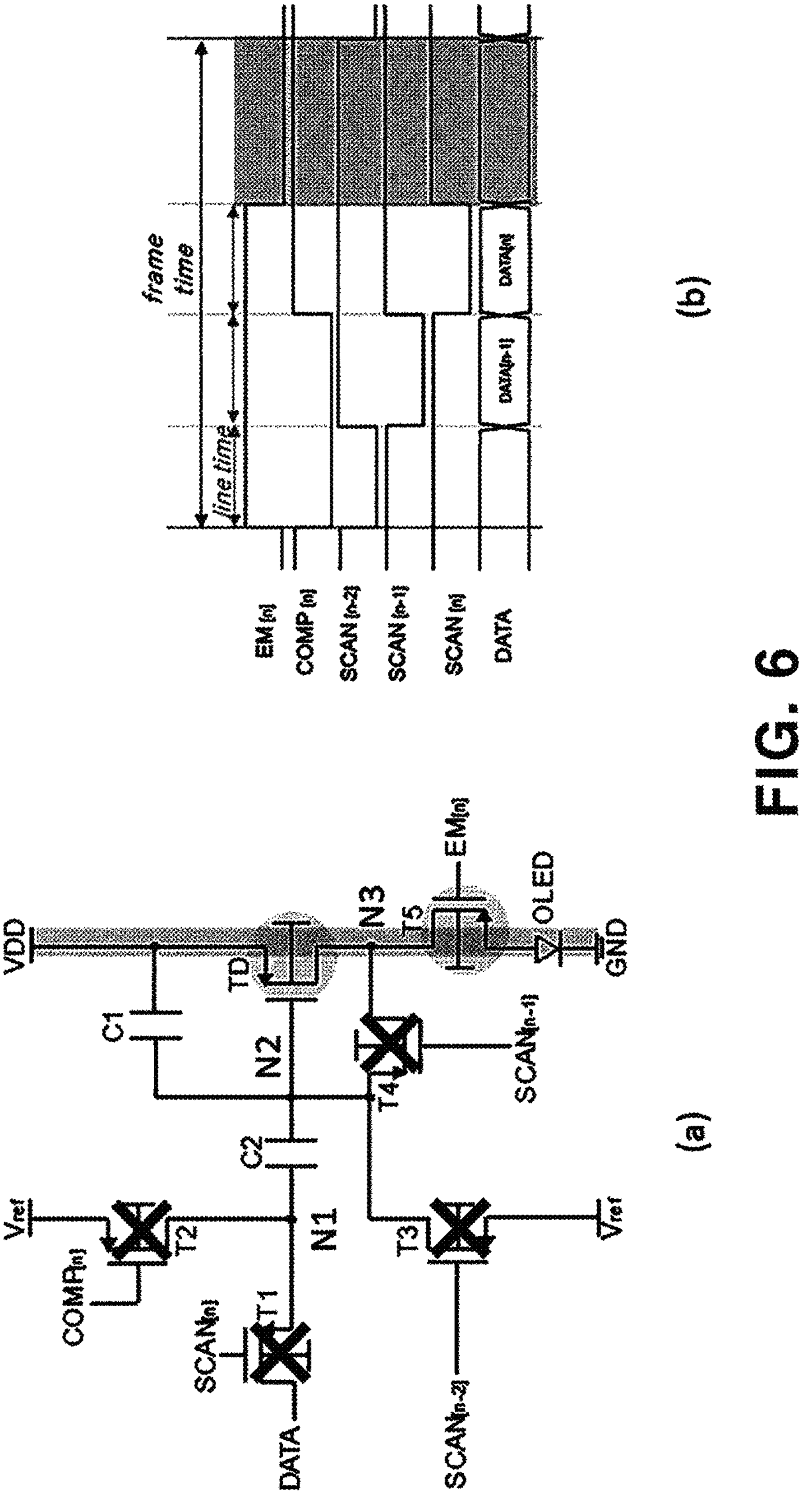

FIG. 6 shows an on-off state of each transistor and timings of control signals in the light emission operation.

Since only an emission signal $EM_{[n]}$ is zero, the transistors other than the fifth transistor T5 are turned off, and a current flows from the power voltage VDD to the OLED so that the OLED is turned on.

In this case, the current flowing in the OLED is equal to a source-drain current of the driving transistor TD and is expressed in the following equation.

$$I_{OLED}=I_O\exp((V_{gate,TD}-V_{source,TD})-V_{th,TD})/\eta V_T)$$

By putting $V_x$, which is the gate voltage of the driving transistor TD, into the above equation, the following equation may be obtained.

$$I_{OLED}=I_O\exp((1/\eta V_T)*(C_2/(C_1+C_2))(V_{ref}-V_{DATA}))$$

As a result, the OLED emits light with the current obtained from the above equation. Here, it can be seen that the reference voltage $V_{ref}$ is added to the data voltage $V_{DATA}$ and multiplied by $C_2/(C_1+C_2)$. Therefore, when the two values are adjusted, a range of the input information voltage $V_{DATA}$ compared to the output current $I_{OLED}$ of the OLED may be adjusted. As a capacitance of the first capacitor C1 compared to the second capacitor C2 increases, a voltage range corresponding to the same magnitude of a current variation increases. In addition, the reference voltage $V_{ref}$ enables the use of a desired portion by shifting an input voltage-output current response curve in parallel.

According to the present invention, a substrate effect may be removed by removing an effect of the threshold voltage $V_{th}$ of the driving transistor TD from the OLED output current. This is because, unlike the related art, the source voltage of the driving transistor TD is fixed.

In addition, according to the present invention, effects due to non-uniformity of the power and the threshold voltage may be removed. It can be seen that the power voltage VDD and the threshold voltage $V_{th,TD}$ are not shown in the above-obtained equation of the OLED driving current. Therefore, even when the power voltage and the threshold voltage are non-uniform, because the non-uniformity does not affect the OLED driving current and is not reflected in brightness, an effect of increasing uniformity can be obtained.

Figure 7:
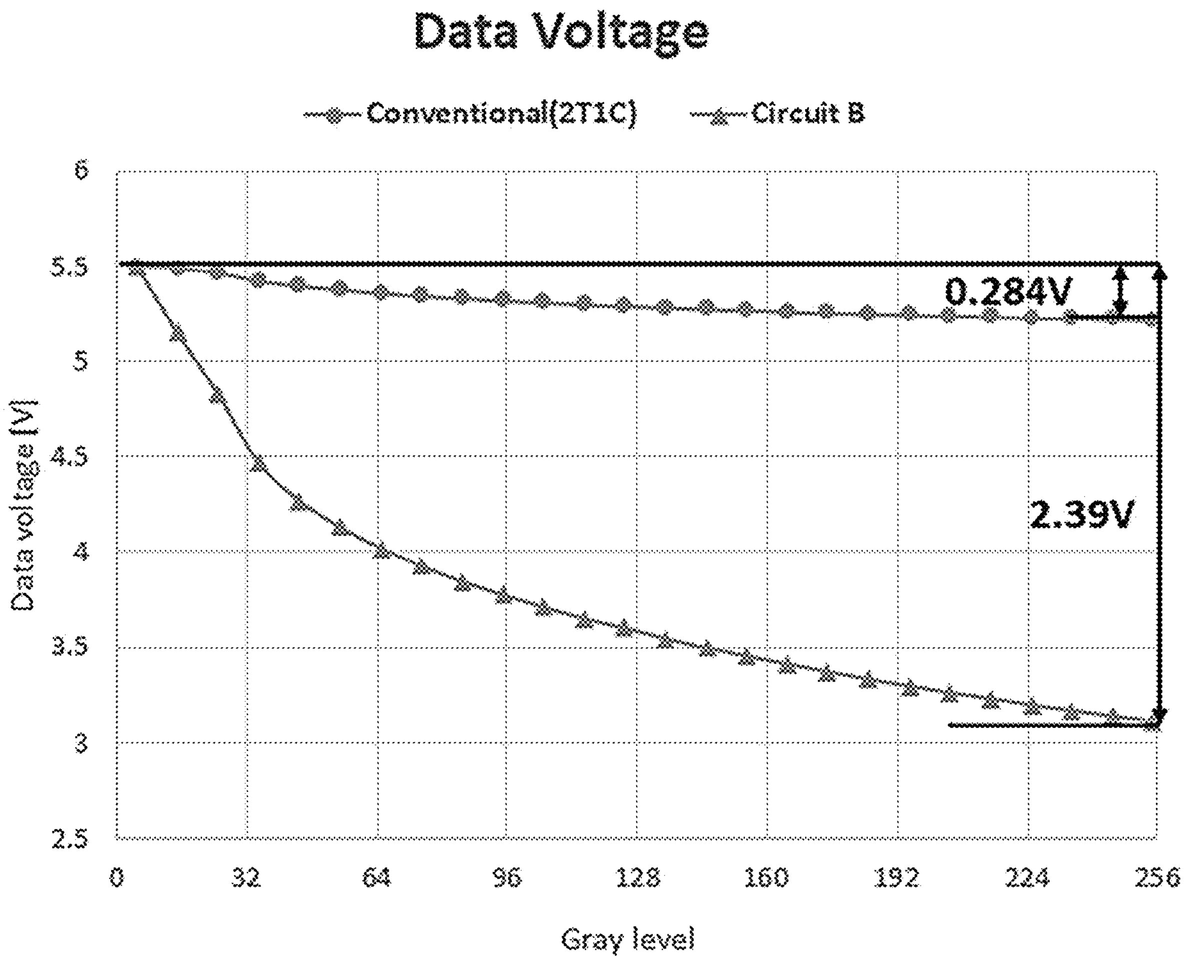
FIGS. 7 and 8A-8B are diagrams illustrating effects of the pixel compensation circuit according to an exemplary embodiment of the present invention.

FIGS. 7 and 8 are diagrams illustrating effects of the pixel compensation circuit according to an exemplary embodiment of the present invention.

FIG. 7 shows a range of an information voltage for expressing 256 grayscale of the OLED.

According to the related art, a range of the information voltage for expressing 256 grayscale is only 0.284 V. That is, even when a small error occurs in the information voltage, grayscale can be greatly changed.

On the other hand, the range of the information voltage according to the present invention is 2.5 V and is about nine times the range of the information voltage according to the related art. Therefore, despite the error of the information voltage, there is an advantage in expressing much more accurate grayscale compared to the related art.

Figure 8A:
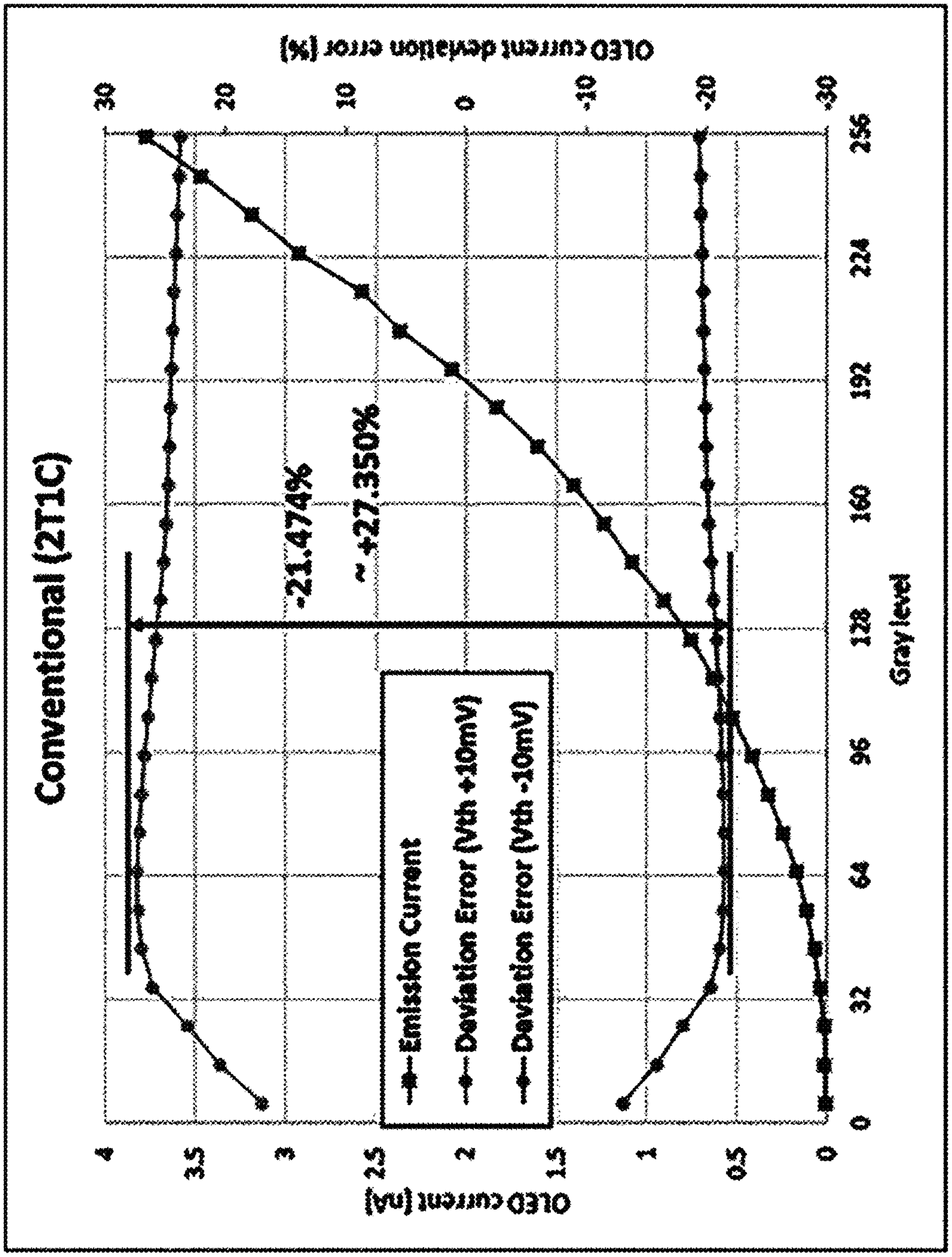
Figure 8B:
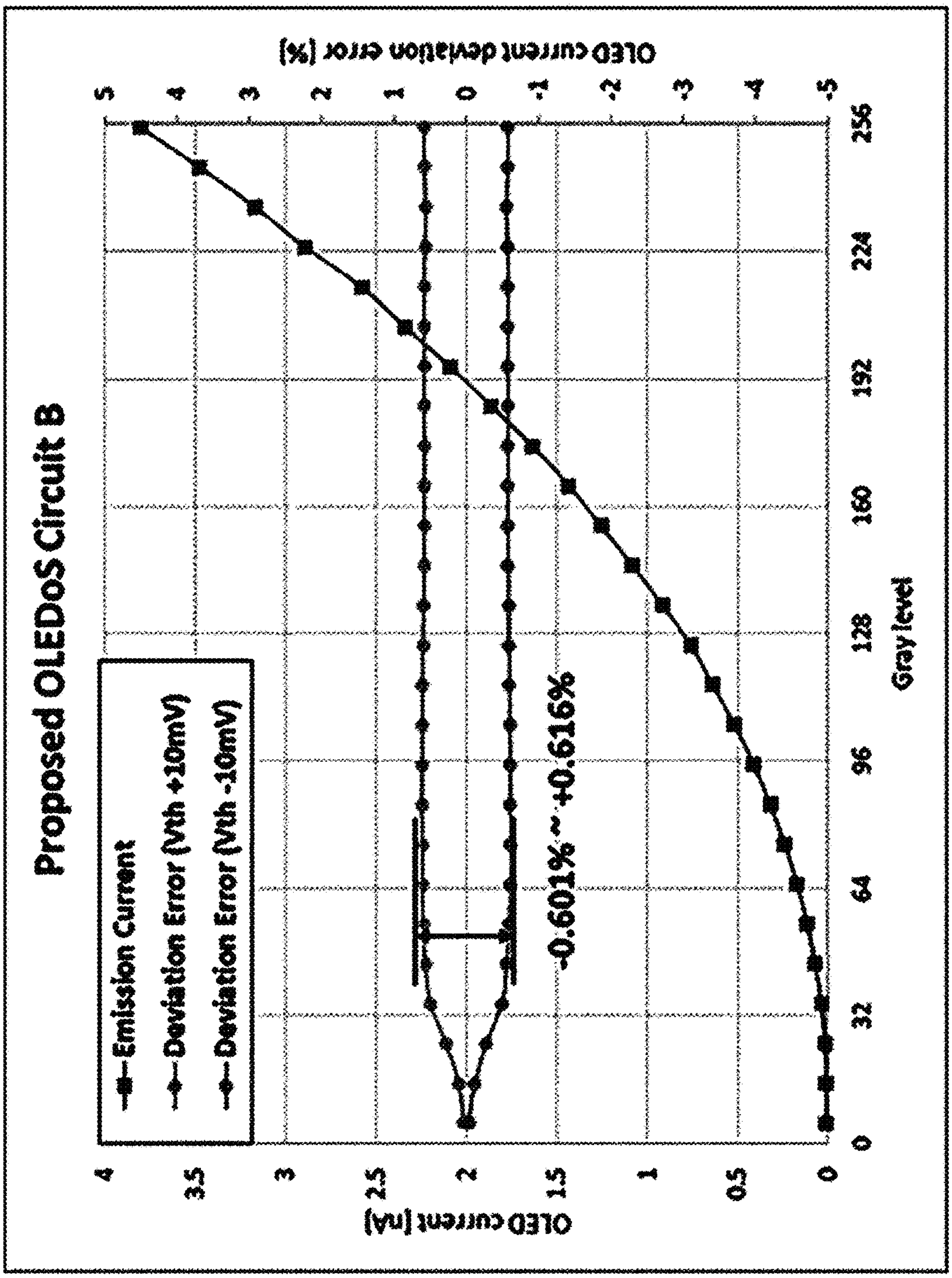

FIGS. 8A-8B shows error rates according to variations in emission current and threshold voltage.

A threshold voltage deviation of a transistor inevitably occurs during the transistor manufacturing process. Therefore, when the deviation is not compensated for, a defect may occur in an image.

FIGS. 8A-8B shows test results of varying the threshold voltage to +10 mV and −10 mV in order to confirm threshold voltage compensation, with FIG. 8A showing test results according to the related art and FIG. 8B showing test results according to the present invention.

It can be confirmed that errors of more than 20% are shown in both directions according to a grayscale variation in the related art, whereas according to the present invention, error rates of about 0.5%, only 1/40 of that of the related art, are shown, showing that compensation is performed well.

Figure 9:
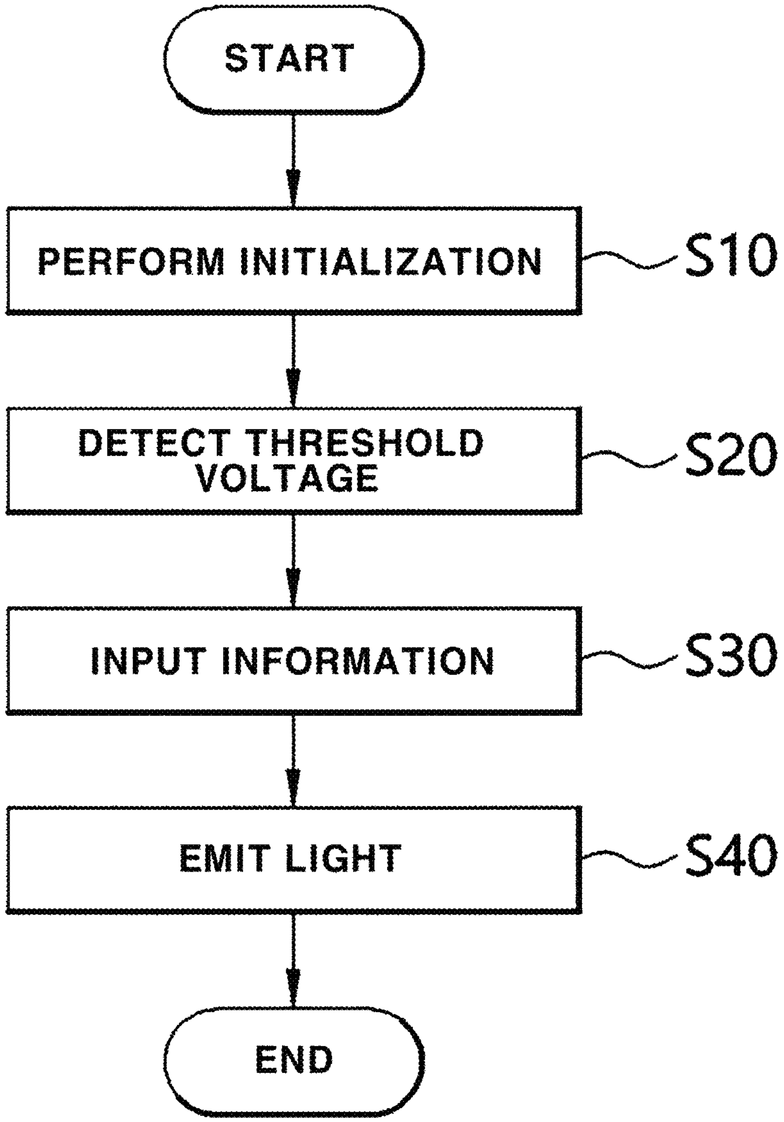
FIG. 9 is a flowchart illustrating a control method of the pixel compensation circuit according to another exemplary of the present invention.

FIG. 9 is a flowchart which summarizes again the control method of the pixel compensation circuit according to another exemplary of the present invention.

The method of controlling the OLED pixel compensation circuit shown in FIG. 2 of the present invention includes four operations.

First, in an initialization operation (S10), the compensation signal $COMP_{[n]}$ and the scan signal $SCAN_{[n-2]}$ from two timings earlier are set to zero.

Since the second transistor T2 and the third transistor T3 are turned on, the first capacitor C1 and the second capacitor C2 are initialized.

Next, in a next threshold voltage detection operation (S20), the compensation signal $COMP_{[n]}$ is maintained at zero, the scan signal $SCAN_{[n-2]}$ from two timings earlier is changed to one, and the scan signal $SCAN_{[n-1]}$ from one timing earlier is set to zero.

Thus, the fourth transistor T4 is turned on, and a gate voltage of the driving transistor TD connected to the fourth transistor T4 is set. In addition, the first capacitor C1 and the second capacitor C3 are charged by the threshold voltage of the driving transistor TD.

Next, in an information input operation (S30), since only the current scan signal $SCAN_{[n]}$ becomes 0, only the first transistor T1 is turned on, and the data voltage $V_{DATA}$ is transmitted to the second capacitor C2 to vary the gate voltage of the driving transistor TD.

Finally, in a light emission operation (S40), only the emission signal $EM_{[n]}$ is zero, and thus only the fifth transistor T5 is turned on.

Since the fifth transistor T5 is turned on, a current flows from the power voltage VDD to the OLED so that the OLED is turned on. In this case, the current which drives the OLED is a source-drain current of the driving transistor TD. Since the current is affected by the reference voltage $V_{ref}$ and the capacitors, the OLED driving current may be controlled by adjusting the reference voltage $V_{ref}$ and capacitances of the first capacitor C1 and the second capacitor C2.

In accordance with the OLED pixel compensation circuit and the control method thereof according to the present invention, by fixing both the source voltage and the body voltage of the driving transistor, there is an advantage in that an error due to a substrate effect does not occur, and thus more accurate pixel compensation is possible.

The scope of the present invention is not limited to the description and expression of the embodiments explicitly described above. In addition, it is also noted that the scope of the present invention cannot be limited due to obvious changes or substitutions in the technical field to which the present invention pertains.

The present invention relates to a circuit and method for compensating for an error of a driving current of an organic light-emitting diode (OLED) using the laws of nature and thus has industrial applicability.

The invention claimed is:

1. An organic light-emitting diode (OLED) pixel compensation circuit comprising:

an OLED element;

a driving transistor configured to drive the OLED element in response to a data signal voltage applied to a gate electrode connected to a second node and connect between a power voltage and a third node;

a first transistor switched by a current scan signal SCAN$_{[n]}$ and configured to transmit the data signal voltage, which is input, to a second capacitor connected to a first node;

a second transistor switched by a compensation signal and configured to transmit a reference voltage to the second capacitor connected to the first node;

a third transistor switched by a scan signal SCAN$_{[n-2]}$, which is two timings earlier than the current scan signal, and configured to transmit the reference voltage to the second node between a first capacitor and the second capacitor;

a fourth transistor switched by a scan signal SCAN$_{[n-1]}$, which is one timing earlier than the current scan signal, and configured to connect between the second node and the third node;

a fifth transistor switched by an emission signal and configured to connect between the third node and one end of the OLED element whose other end is connected to a ground;

the first capacitor connected between the power voltage and the second node; and the second capacitor connected between the first node and the second node.

2. The OLED pixel compensation circuit of claim 1, wherein the first to fifth transistors and the driving transistor are P-type transistors.

3. The OLED pixel compensation circuit of claim 1, wherein the OLED element is an OLED on silicon (OLEDoS).

4. The OLED pixel compensation circuit of claim 1, wherein bodies of the first to fifth transistors and the driving transistor are connected to the power voltage.

5. A control method of the OLED pixel compensation circuit according to claim 1, comprising:

(a) an initialization operation of turning the second transistor and third transistor on and turning the remaining transistors off;

(b) a threshold voltage detection operation of maintaining the second transistor in the turned-on state, turning the fourth transistor on, and turning the remaining transistors off;

(c) an information input operation of turning only the first transistor on and turning the remaining transistors off; and (d) a light emission operation of turning only the fifth transistor on and turning the first to fourth transistors off, wherein the driving transistor is switched by a voltage of the second node to drive the OLED element.

* * * * *